United States Patent Office.

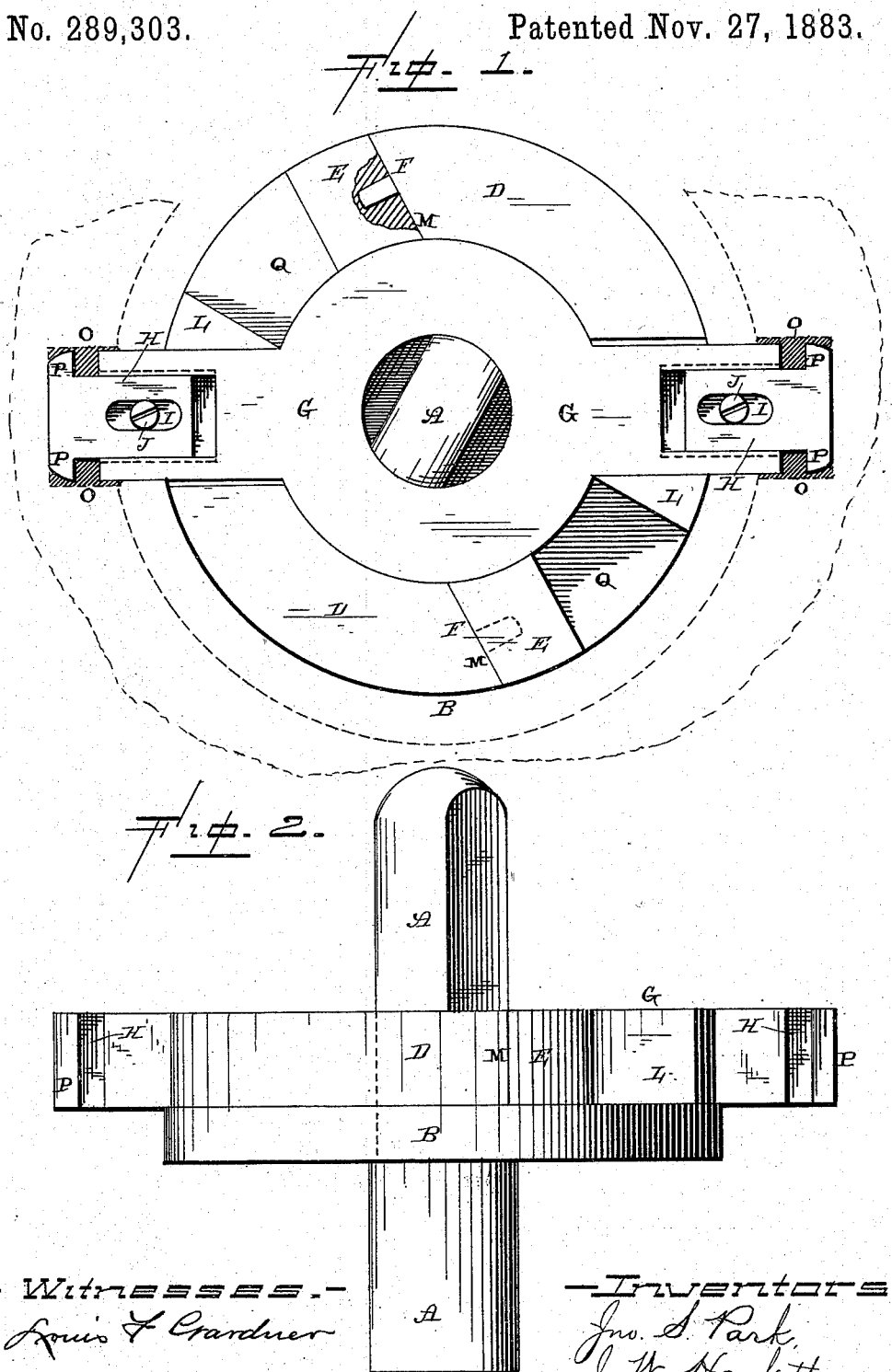

JOHN S. PARK AND JONATHAN W. HACKETT, OF ROCKPORT, INDIANA; SAID HACKETT ASSIGNOR TO W. R. BEELER, OF SAME PLACE.

MILLSTONE-DRIVER.

SPECIFICATION forming part of Letters Patent No. 289,303, dated November 27, 1883.

Application filed March 17, 1883. (No model.)

*To all whom it may concern:*

Be it known that we, JOHN S. PARK and JONATHAN W. HACKETT, of Rockport, in the county of Spencer and State of Indiana, have invented certain new and useful Improvements in Millstone-Drivers; and we do hereby declare the following to be a full, clear, and exact description of the invention, such as will enable others skilled in the art to which it pertains to make and use it, reference being had to the accompanying drawings, which form part of this specification.

Our invention relates to an improvement in millstone-drivers; and it consists, first, in a millstone-driver having adjustable flanged ends and a means of securing the ends in place, in combination with the runner-stone, having pockets to receive the ends of the driver, the ends of the driver being adapted to be secured in the pockets of the stone by means of some melted metal; second, the combination of a millstone-driver having adjustable flanged ends, with a runner-stone having boxes to receive the adjustable ends, the adjustable ends being adapted to be locked in place by means of melted metal, which is poured into the boxes around the ends.

Figure 1 is a plan view of our invention complete. Fig. 2 is a side elevation of the same.

A represents the mill-spindle, which is flattened at its top for the purpose of forming shoulders upon which the driving-clutch B rests. The opening through the clutch, and through which this flattened portion of the spindle passes, corresponds to the flattened portion of the spindle, so that when the spindle revolves the clutch will be made to revolve with it. Upon opposite sides of this clutch are formed the circular recessed flanges or portions D, and upon one end, M, of each of these flanges is formed a stud or projection, F, which fits into a corresponding socket formed in the inner side of a block of rubber or other suitable spring, E. Placed upon the top of this driving-clutch is the millstone-driver G, which has a circular opening through its center, and through which the flattened portion of the mill-spindle passes. As the opening through this driver is circular, it is not affected in any manner by the movement of the spindle itself, but receives its movement entirely from the clutch. Instead of making the ends H of the driver in one solid part, they are here made adjustable, as shown, so that they can be moved outward to bear solidly against the sides of the boxes O in the stone, and then melted lead or other suitable substance can be poured around the outer flanged portions, P, of the adjustable ends H, so as to hold them rigidly in position. This melted substance fills the boxes O and the spaces between the ends of the driver and the flanges P, as shown. In this manner the driver can be secured as rigidly to the stone as though it formed a part of it. The ends H are here made adjustable by means of the slots I and the guiding bolts or screws J, and the slotted portions are made to fit in dovetailed recesses formed in the tops of the ends of the driver. We do not limit ourselves to this precise construction, for this may be varied at will.

Secured to or formed upon opposite sides of the driver are the triangular portions L, against which the springs are made to bear. These parts L are shaped as shown, so that the driver will receive a direct pressure from the springs, and thus cause the springs to be equally compressed from opposite sides. As is shown in Fig. 1, the parts L need not always be in contact with the springs E, as there are spaces Q formed between, so as to allow the clutch to be moved out of contact with the driver. In case of a sudden stoppage of the mill-spindle from any cause these springs receive the concussion from the driver, and, by their elasticity, prevent the backlash from injuring the stone in any manner.

No claim is here made to the other parts of the device not referred to in the claims, for they are substantially old, and are here shown in this connection for the purpose of illustrating a complete millstone-driver.

Having thus described our invention, we claim—

1. The combination of a millstone-driver having movable flanged ends with a runner-stone having pockets to receive the ends of the driver, the ends of the driver being adapted to be secured in place by means of some melted metal, substantially as shown.

2. The combination of the running-stone having the boxes or pockets O with the driver G, having the adjustable flanged ends H P, and means for holding the ends in place, the ends being adapted to be locked in the boxes by having melted material poured around them, substantially as shown.

In testimony whereof we affix our signatures in presence of two witnesses.

JOHN S. PARK.
JONATHAN W. HACKETT.

Witnesses:
WILLIAM PFEIFER,
FERDINAND WAGNER.